(12) United States Patent
Iijima

(10) Patent No.: US 12,405,914 B2
(45) Date of Patent: Sep. 2, 2025

(54) DISPLAY APPARATUS WITH POWER CONSUMPTION CONTROL IN RELATION TO EXTERNAL DEVICE CONNECTIONS

(71) Applicant: Hideaki Iijima, Kanagawa (JP)

(72) Inventor: Hideaki Iijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 18/360,064

(22) Filed: Jul. 27, 2023

(65) Prior Publication Data

US 2024/0070108 A1  Feb. 29, 2024

(30) Foreign Application Priority Data

Aug. 25, 2022  (JP) .................................. 2022-134268

(51) Int. Cl.
   G06F 13/42    (2006.01)
   G06F 13/38    (2006.01)

(52) U.S. Cl.
   CPC ........ G06F 13/4282 (2013.01); G06F 13/382 (2013.01); *G06F 2213/0042* (2013.01)

(58) Field of Classification Search
   CPC ............... G06F 13/4282; G06F 13/382; G06F 2213/0042
   (Continued)

(56) References Cited

U.S. PATENT DOCUMENTS 7,613,939 B2 * 11/2009 Karam .................... H04L 12/10
                                                  710/305
8,804,817 B2 *  8/2014 Lee ...................... H04L 1/0041
                                                  375/240.26

(Continued)

FOREIGN PATENT DOCUMENTS

JP    2020-124035 A     8/2020
JP    2021-162875 A    10/2021

OTHER PUBLICATIONS

U.S. Appl. No. 18/155,298, filed Jan. 17, 2023.

*Primary Examiner* — Farley Abad
*Assistant Examiner* — Henry W Yu
(74) *Attorney, Agent, or Firm* — IPUSA, PLLC

(57) ABSTRACT

A display apparatus includes a plurality of connectors including a first connector and a second connector, a power supply, a display panel, and circuitry. Each of the plurality of connectors is connectable with one of a plurality of external devices including a first external device and a second external device. The circuitry is to detect that one of the plurality of external devices is connected to one of the plurality of connectors, perform negotiation on electric power with the external device that is detected, and control the power supply to output, based on a result of the negotiation, electric power to be used by the external device that is detected from the connector. In a case that the circuitry detects that the first external device is connected to the first connector and the second external device is connected to the second connector, the circuitry is further to control the power supply to output electric power, input from the first connector connected to the first external device, from the second connector to the second external device. In a case that the electric power to be output from the second connector is determined to be smaller in amount than the electric power to be used by the second external device, the circuitry is to control the power supply to reduce power consumption of the display apparatus to output an amount of the electric power to be used by the second external device from the second connector.

12 Claims, 10 Drawing Sheets

(58) Field of Classification Search
USPC .......... 710/8, 14, 15, 62, 104, 105; 713/310
See application file for complete search history.

(56) References Cited

U.S. PATENT DOCUMENTS

| | | | | |
|---|---|---|---|---|
| 8,902,149 | B2* | 12/2014 | Kerofsky | G09G 3/3611 |
| | | | | 700/297 |
| 10,460,674 | B1* | 10/2019 | Liu | G09G 3/2096 |
| 11,460,900 | B2* | 10/2022 | Nagano | G09G 3/20 |
| 2006/0036885 | A1* | 2/2006 | Hsieh | G06F 1/266 |
| | | | | 713/300 |
| 2008/0098247 | A1* | 4/2008 | Lee | G06F 1/1616 |
| | | | | 710/1 |
| 2009/0143053 | A1* | 6/2009 | Levien | H04W 4/16 |
| | | | | 455/41.2 |
| 2010/0261506 | A1* | 10/2010 | Rajamani | H04W 52/027 |
| | | | | 455/566 |
| 2012/0284552 | A1* | 11/2012 | Archer, Jr. | G06F 1/3203 |
| | | | | 713/324 |
| 2013/0191662 | A1* | 7/2013 | Ingrassia, Jr. | G06F 1/3206 |
| | | | | 713/320 |
| 2014/0201546 | A1* | 7/2014 | Hiraki | G06F 1/3228 |
| | | | | 713/310 |
| 2016/0381414 | A1* | 12/2016 | Legair-Bradley | H04N 21/44 |
| | | | | 348/730 |
| 2017/0235357 | A1* | 8/2017 | Leung | G06F 1/3212 |
| | | | | 713/310 |
| 2018/0123385 | A1* | 5/2018 | Akiyama | H02J 7/007 |
| 2020/0167013 | A1 | 5/2020 | Saito | |
| 2020/0388239 | A1* | 12/2020 | Li | G06F 13/4282 |
| 2022/0342514 | A1* | 10/2022 | Chao | G06F 3/0482 |
| 2023/0067554 | A1 | 3/2023 | Asanuma | |

* cited by examiner

FIG. 4
(a) 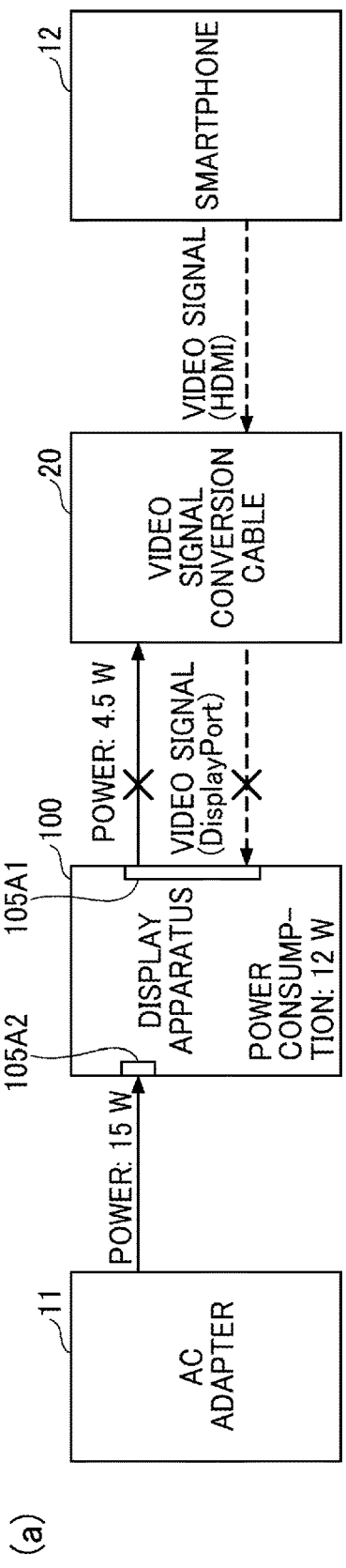
(b) 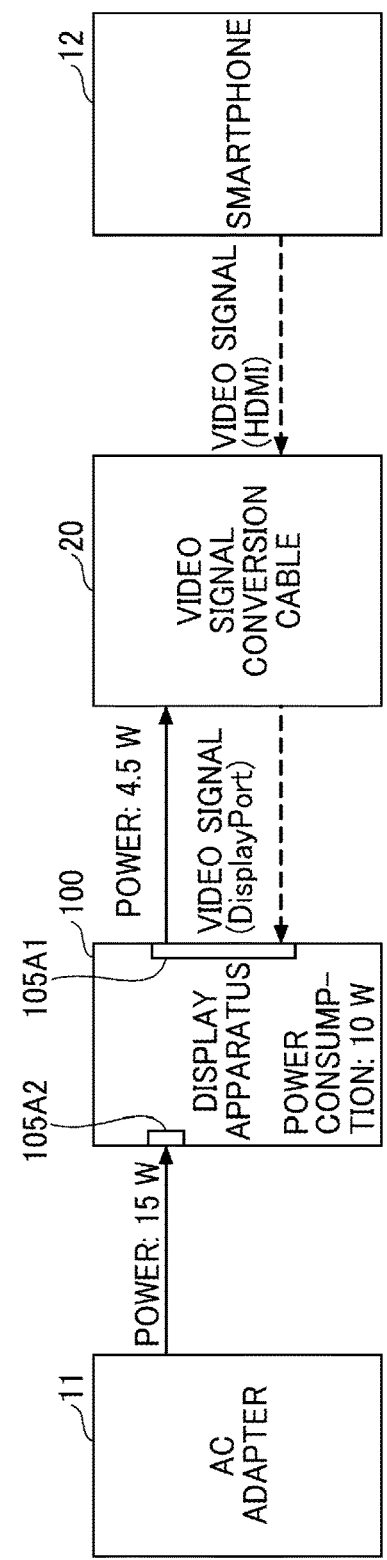

DISPLAY APPARATUS WITH POWER CONSUMPTION CONTROL IN RELATION TO EXTERNAL DEVICE CONNECTIONS

CROSS-REFERENCE TO RELATED APPLICATIONS

This patent application is based on and claims priority pursuant to 35 U.S.C. § 119(a) to Japanese Patent Application No. 2022-134268, filed on Aug. 25, 2022, in the Japan Patent Office, the entire disclosure of which is hereby incorporated by reference herein.

BACKGROUND

Technical Field

Embodiments of the present disclosure relate to a display apparatus.

Related Art

In the related art, there is a technology of receiving electric power from an external device or supplying electric power to an external device via an interface such as a universal serial bus (USB).

Using such a technology, a power supply pass-through technology is provided, which supplies electric power from a first external device connected to one interface to a second external device connected to another interface.

SUMMARY

In one aspect, a display apparatus includes a plurality of connectors including a first connector and a second connector, a power supply, a display panel, and circuitry. Each of the plurality of connectors is connectable with one of a plurality of external devices including a first external device and a second external device. The circuitry is to detect that one of the plurality of external devices is connected to one of the plurality of connectors, perform negotiation on electric power with the external device that is detected, and control the power supply to output, based on a result of the negotiation, electric power to be used by the external device that is detected from the connector. In a case that the circuitry detects that the first external device is connected to the first connector and the second external device is connected to the second connector, the circuitry is further to control the power supply to output electric power, input from the first connector connected to the first external device, from the second connector to the second external device. In a case that the electric power to be output from the second connector is determined to be smaller in amount than the electric power to be used by the second external device, the circuitry is to control the power supply to reduce power consumption of the display apparatus to output an amount of the electric power to be used by the second external device from the second connector.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating an overview of power pass-through control performed by a display apparatus according to an embodiment of the present disclosure;

Figure 1:
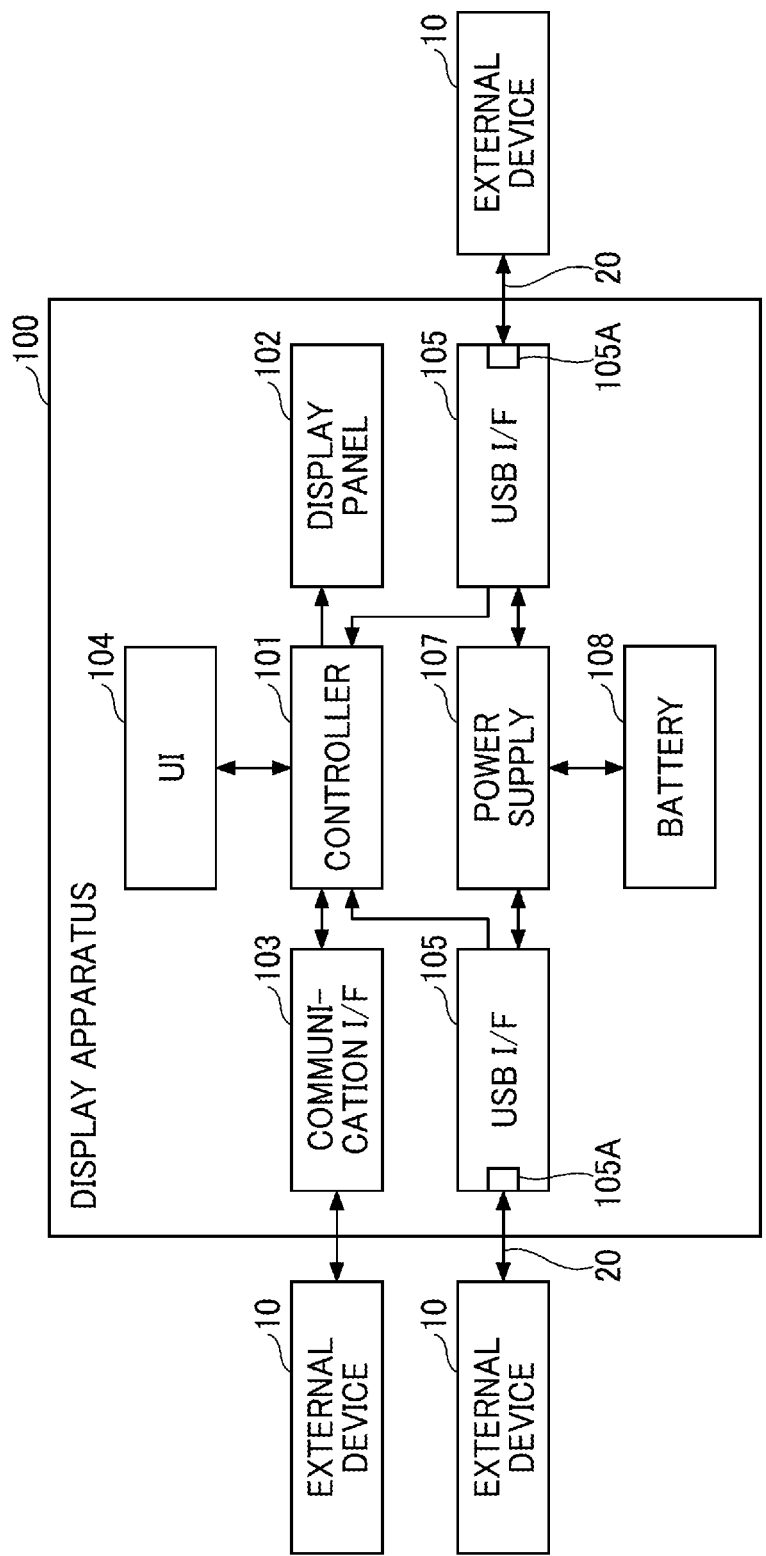
FIG. 1 is a block diagram illustrating a hardware configuration of a display apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

Hardware Configuration of Display Apparatus

FIG. 1 is a block diagram illustrating a hardware configuration of a display apparatus 100 according to the present embodiment.

The display apparatus 100 illustrated in FIG. 1 includes a display panel 102 on a front face of a housing. When the display apparatus 100 is connected to one of external devices 10 (for example, a laptop personal computer (PC) or a smartphone) via one of video signal conversion cables 20 corresponding to the one of the external devices 10 and receives a video signal from the one of the external devices 10 via the one of the video signal conversion cables 20, the display apparatus 100 displays video on the display panel 102 according to the video signal. The display apparatus 100 is a thin display apparatus that incorporates a battery 108 and is portable. Accordingly, the display apparatus 100 is carried together with one or more external devices 10. At the time of use, the display apparatus 100 is connected to one of the one or more external devices 10 to be used as an extended display of the one of the one or more external devices 10. In the following description, the external devices 10 may be referred to as a single external device 10 unless the external devices 10 are to be distinguished from each other. Similarly, the video signal conversion cables 20 may be referred to as a single video signal conversion cable 20 unless the video signal conversion cables 20 are to be distinguished from each other.

For example, the display apparatus 100 may be used as the extended display by a sales representative when making a presentation at a customer site. Further, for example, the display apparatus 100 may be used as an external display for an external device 10 such as a personal computer (PC) at an office. Furthermore, for example, the display apparatus 100 may be used as an extended display for watching a moving image or working at home when the display apparatus 100 is connected to a smartphone used by an individual outside of an office.

As illustrated in FIG. 1, the display apparatus 100 includes a controller 101, the display panel 102, a communication interface (I/F) 103, a user interface (UI) 104, universal serial bus (USB) I/Fs 105, a power supply 107, and the battery 108. In the following description, the USB I/Fs 105 may be referred to as a single USB I/F 105 unless the USB I/Fs 105 are to be distinguished from each other.

The controller 101 controls entire operation of the display apparatus 100. For example, the controller 101 is implemented by a control circuit such as an integrated circuit (IC) including a central processing unit (CPU), a read only memory (ROM), and a random access memory (RAM).

On the display panel 102, various images (moving images and still images) are displayed according to video signals transmitted from the controller 101. A liquid crystal display or an organic electro luminescence (EL) display may be used as the display panel 102, for example.

The communication I/F 103 is an interface for controlling connection and communication by wireless communication with the external device 10. The communication I/F 103 is connected to the external device 10 (for example, a laptop PC or a smartphone) by wireless communication, and transmits and receives a control signal and a video signal to and from (performs wireless communication with) the external device 10. For example, Wireless Fidelity (Wi-Fi) is used as a wireless communication standard used by the communication I/F 103.

The UI 104 is an interface that receives an input from an operator with an operation performed by the operator. For example, the display apparatus 100 includes a plurality of buttons on side faces and the front face of the housing as the UI 104. These buttons are, for example, a power button, a select button, an enter button, and a return button. The UI 104 is not limited to these buttons described above. The display apparatus 100 may include another input device (for example, a touch sensor superimposed on the front face of the display panel 102) as the UI 104. For example, in response to operations performed by the operator to the UI 104, the display apparatus 100 turns on and off the power and performs various settings such as settings of brightness and contrast.

The USB I/Fs 105 are interfaces for connecting the external devices 10. Each of the USB I/Fs 105 includes a USB port 105A that serves as a "connector" and conforms to the USB standard. A USB cable such as a video signal conversion cable 20 is connected to the USB port 105A Accordingly, a USB I/F 105 to which the USB port 105A belongs is connected to the external device 10 via the USB cable. For example, when a communication terminal (for example, a laptop PC or a smartphone) is connected to the USB I/F 105 as the external device 10, the USB I/F 105 transmits and receives a control signal, a video signal, and electric power to and from the communication terminal. Further, for example, when an external power supply is connected to the USB I/F 105 as the external device 10, the USB I/F 105 receives electric power supplied from the external power supply.

The display apparatus 100 includes a plurality of USB I/Fs 105. Multiple external devices 10 can be separately connected to the plurality of USB I/Fs 105. In the present embodiment described with reference to FIG. 1, the display apparatus 100 includes two USB I/Fs 105. The number of the USB I/Fs 105 is not limited to two. The display apparatus 100 may include three or more USB I/Fs 105.

The power supply 107 controls the supply of electric power to each component of the display apparatus 100 to drive each component. For example, when electric power is not supplied from the external device 10 (such as an external power supply or a communication terminal) or when electric power supplied from the external device 10 (such as an external power supply or a communication terminal) is insufficient, the power supply 107 can supply electric power stored in the battery 108 to each component of the display apparatus 100. Further, for example, when electric power is supplied from the external device 10 (such as an external power supply or a communication terminal), the power supply 107 can supply the electric power supplied from the external device 10 to each component of the display apparatus 100. Furthermore, for example, the power supply 107 can pass through the electric power supplied from the external device 10 (such as an external power supply or a communication terminal) connected to one USB I/F 105 and supply the electric power to another external device 10 (such as a communication terminal) connected to the other USB I/F 105.

The battery 108 stores electric power to drive the display apparatus 100. Various rechargeable secondary batteries (for example, a lithium-ion battery and a lithium polymer battery) are usable as the battery 108. The display apparatus 100 (for example, the power supply 107) can charge the battery 108 with electric power supplied from the external device 10 (an external power supply or a communication terminal) connected to the USB I/F 105.

Hardware Configuration of Video Signal Conversion Cable

Figure 2:
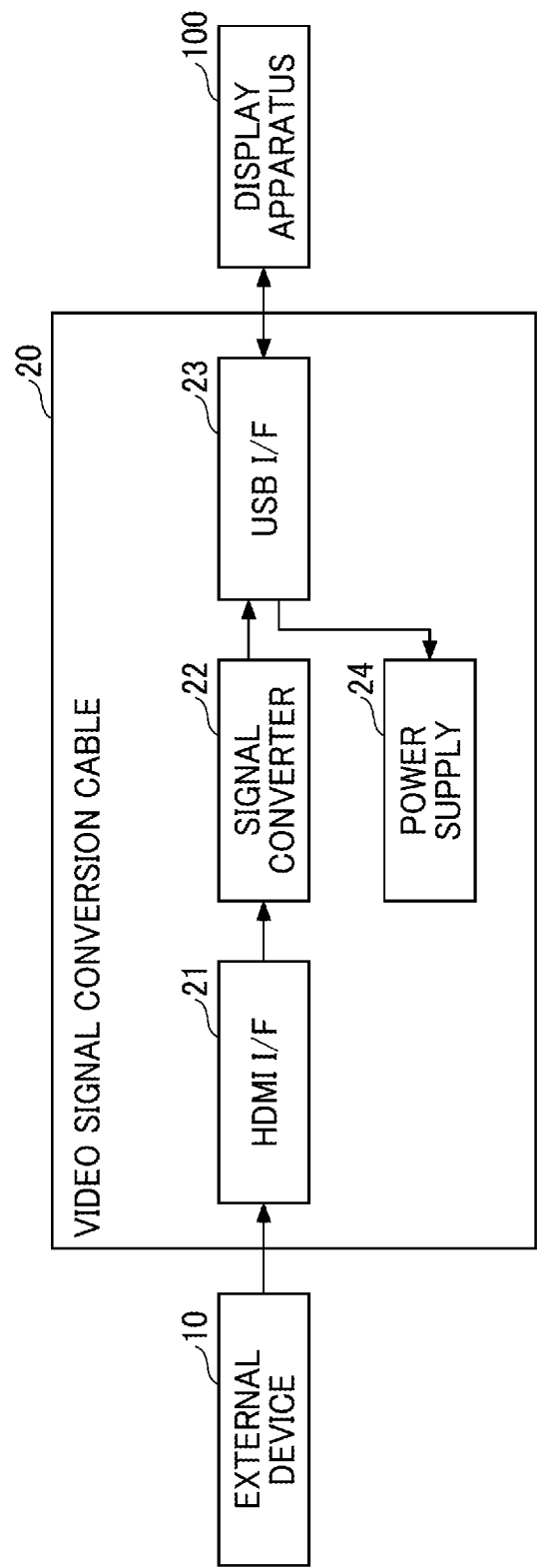
FIG. 2 is a block diagram illustrating a hardware configuration of a video signal conversion cable according to an embodiment of the present disclosure.

FIG. 2 is a block diagram illustrating a hardware configuration of the video signal conversion cable 20 according to the present embodiment.

As illustrated in FIG. 2, the video signal conversion cable 20 includes a HIGH-DEFINITION MULTIMEDIA INTERFACE (HDMI) I/F 21, a signal converter 22, a USB I/F 23, and a power supply 24.

The HDMI I/F 21 is an interface for connecting the video signal conversion cable 20 to the external device 10 (a communication terminal). For example, the HDMI I/F 21 is connected to an HDMI terminal included in the external device 10, and transmits and receives a control signal, a video signal, and electric power to and from the external device 10 (a communication terminal).

The signal converter 22 converts the video signal received from the external device 10 via the HDMI I/F 21 into a video signal based on which the display apparatus 100 can display video.

The USB I/F 23 is an interface for connecting the video signal conversion cable 20 to the display apparatus 100. For example, the USB I/F 23 is connected to one of USB ports 105A included in the display apparatus 100, and transmits and receives, for example, a control signal, a video signal, and electric power to and from the display apparatus 100.

The power supply 24 controls supply of electric power to each component of the video signal conversion cable 20 to drive each component. For example, the power supply 24 supplies electric power supplied from the display apparatus 100 via the USB I/F 23 to each component of the video signal conversion cable 20.

For example, the video signal conversion cable 20 receives a video signal transmitted from the external device 10 with the HDMI I/F 21 and converts, with the signal converter 22, the video signal into another video signal based on which the display apparatus 100 can display video. The video signal conversion cable 20 outputs the other video signal converted by the signal converter 22 (i. e., the video signal based on which the display apparatus 100 can display video) to the display apparatus 100 with the USB I/F 23.

Further, for example, when the display apparatus 100 performs power pass-through control, the video signal conversion cable 20 receives electric power supplied from the display apparatus 100 with the USB I/F 23 and supplies the electric power to each component of the video signal conversion cable 20.

Figure 3:
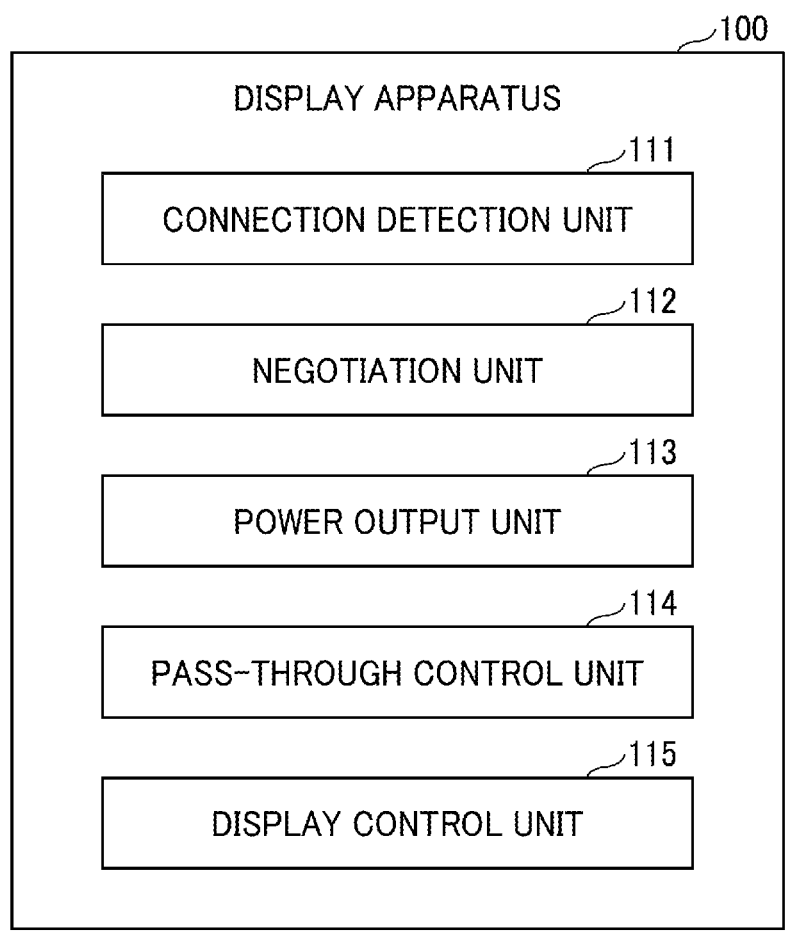
FIG. 3 is a block diagram illustrating a functional configuration of a display apparatus according to an embodiment of the present disclosure.

Functional Configuration of Display Apparatus FIG. 3 is a block diagram illustrating a functional configuration of the display apparatus 100 according to the present embodiment. As illustrated in FIG. 3, the display apparatus 100 includes a connection detection unit 111, a negotiation unit 112, a power output unit 113, a pass-through control unit 114, and a display control unit 115.

The connection detection unit 111 detects that the external device 10 is connected to the USB port 105A included in the USB I/F 105. For example, the connection detection unit 111 detects that the external device 10 is connected to the USB port 105A based on the resistance value of a specific terminal (e.g., a configuration channel (CC) pin) included in the USB port 105A in accordance with the specification of the USB standard.

The negotiation unit 112 performs negotiation on electric power with the external device 10 connected to the USB port 105A. For example, the negotiation unit 112 obtains information such as the electric power (voltage and ampere) required by the external device 10 and the electric power (voltage and ampere) that can be output from the external device 10 by performing negotiation with the external device 10. When the video signal conversion cable 20 is connected to the USB port 105A, the negotiation unit 112 can perform negotiation with the video signal conversion cable 20.

The power output unit 113 outputs, based on a result of the negotiation performed by the negotiation unit 112, the electric power required by the external device 10 connected to the USB port 105A from the USB port 105A to which the external device 10 is connected. For example, the power output unit 113 controls the power supply 107 to supply electric power.

When a first external device 10 and a second external device 10 are connected to a first USB port 105A and a second USB port 105A, respectively, the pass-through control unit 114 outputs, in accordance with the specification of the USB Power Delivery (USB-PD) standard, the electric power input to the first USB port 105A through the second USB port 105A. Accordingly, the pass-through control unit 114 can supply electric power to the second external device 10 connected to the second USB port 105A to drive the second external device 10.

At this time, when the electric power that can be output from the second USB port 105A is determined to be smaller than the electric power required by the second external device 10, which is specified by the information on the electric power obtained from the second external device 10 by the negotiation unit 112, the pass-through control unit 114 performs control such that the electric power required by the second external device 10 can be output from the second USB port 105A by reducing the power consumption of the display apparatus 100.

Accordingly, even when the electric power input to the first USB port 105A is relatively small and the electric power that can be output from the second USB port 105A is determined to be smaller than the electric power required by the second external device 10, the display apparatus 100 according to the present embodiment can output the electric power required by the second external device 10 from the second USB port 105A to drive the second external device 10.

For example, the pass-through control unit 114 performs control such that the electric power required by the video signal conversion cable 20 can be supplied to the video signal conversion cable 20 by lowering an upper limit value of brightness of the display panel 102 included in the display apparatus 100 to reduce the power consumption of the display apparatus 100.

Accordingly, even when the electric power that can be output from the second USB port 105A is determined to be smaller than the electric power required by the second external device 10, the display apparatus 100 according to the present embodiment can output the electric power required by the second external device 10 from the second USB port 105A by lowering the upper limit value of the brightness of the display panel 102 included in the display apparatus 100 to drive the second external device 10.

In this case, the pass-through control unit 114 may determine an amount of the upper limit value of the brightness of the display panel 102 to be lowered according to a shortage amount of the electric power required by the video signal conversion cable 20. For example, assuming that the shortage amount of the electric power required by the video signal conversion cable 20 is W1, the pass-through control unit 114 may determine the amount of the upper limit of the brightness of the display panel 102 to be lowered to be W1 or W1+a. The value α is a certain margin value.

Accordingly, the display apparatus 100 according to the present embodiment can output the electric power required by the second external device 10 from the second USB port 105A without the upper limit value of the brightness of the display panel 102 being greatly lowered.

Further, for example, the pass-through control unit 114 may perform control such that the electric power required by the video signal conversion cable 20 can be supplied to the video signal conversion cable 20 by turning off a wireless communication function (e.g., the communication I/F 103) included in the display apparatus 100 to reduce the power consumption of the display apparatus 100.

Accordingly, even when the electric power that can be output from the second USB port 105A is determined to be smaller than the electric power required by the second external device 10, the display apparatus 100 according to the present embodiment can output the electric power required by the second external device 10 from the second USB port 105A by turning off the wireless communication function included in the display apparatus 100 to drive the second external device 10.

The USB-PD standard has the following features.

(1) The electric power of 100 watt (W) (20 voltage (V) and 5 ampere (A)) can be supplied at maximum. For this purpose, the output voltage can be varied in a plurality of (four or five) stages.

(2) A device having a plurality of terminals conforming to the USB-PD standard (USB Type-C terminals) receives electric power from one terminal and outputs the electric power from another terminal to supply the electric power to a downstream device in a string manner.

(3) An external device to be connected to the device having the terminals can turn to be both a device that receives electric power and a device that outputs electric power. The electric power can be supplied in both directions.

The display control unit 115 can display various kinds of information on the display panel 102.

For example, the display control unit 115 displays various setting screens (e.g., a brightness setting screen) on the display panel 102.

Further, for example, when the display apparatus 100 is switched to a low brightness mode, the display control unit 115 displays, on the display panel 102, a message for notifying the operator that the display apparatus 100 is to be switched to the low brightness mode.

Furthermore, for example, when the wireless communication function included in the display apparatus 100 is turned off, the display control unit 115 displays, on the display panel 102, a message for notifying the operator that the wireless communication function included in the display apparatus 100 is to be turned off.

Overview of Power Pass-Through Control Performed by Display Apparatus

FIG. 4 is a diagram illustrating an overview of power pass-through control performed by the display apparatus 100 according to the present embodiment.

In the present embodiment described with reference to each of parts (a) and (b) of FIG. 4, a smartphone 12 is connected to a first USB port 105A1 of the display apparatus 100 via the video signal conversion cable 20. Accordingly, the display apparatus 100 can display an image on the display panel 102 based on a video signal transmitted from the smartphone 12 via the video signal conversion cable 20.

Also, in the present embodiment described with reference to each of parts (a) and (b) of FIG. 4, an alternating current (AC) adapter 11 is connected to a second USB port 105A2 of the display apparatus 100. Accordingly, the display apparatus 100 is driven by the electric power supplied from the AC adapter 11. The video signal conversion cable 20 can also be driven by a part of the electric power supplied from the AC adapter 11, which is to be passed through to the video signal conversion cable 20 by the display apparatus 100.

The AC adapter 11 according to the present embodiment serves as an external device that serves as a device from which electric power is to be supplied. The video signal conversion cable 20 according to the present embodiment serves as an external device that serves as a device to which electric power is to be supplied.

When the electric power that can be output from the first USB port 105A1 is determined to be smaller than the electric power required by the video signal conversion cable 20, the display apparatus 100 performs control such that the electric power required by the video signal conversion cable 20 can be output from the first USB port 105A1 by reducing the power consumption of the display apparatus 100.

For example, in the present embodiment described with reference to part (a) of FIG. 4, the electric power supplied from the AC adapter 11 is "15 W" and the power consumption of the display apparatus 100 is "12 W." In this case, the electric power that can be output from the first USB port 105A1 is "3 W." Assuming that the electric power required by the video signal conversion cable 20 is "4.5 W," the display apparatus 100 cannot output the electric power "4.5 W" that is required by the video signal conversion cable 20 from the first USB port 105A1. Accordingly, the video signal conversion cable 20 cannot be driven, cannot convert the video signal transmitted from the smartphone 12, and cannot transmit the converted video signal to the display apparatus 100.

In this case, the display apparatus 100 reduces the power consumption of the display apparatus 100 as illustrated in part (b) of FIG. 4 by, for example, lowering the upper limit value of the brightness of the display panel 102 included in the display apparatus 100 or by turning off the wireless communication function included in the display apparatus 100.

For example, in the present embodiment described with reference to part (b) of FIG. 4, the display apparatus 100 reduces the power consumption of the display apparatus 100 to "10 W." Accordingly, the electric power that can be output from the first USB port 105A1 is increased to "5 W." In this way, the display apparatus 100 can output the electric power "4.5 W" required by the video signal conversion cable 20 from the first USB port 105A1. As a result, the video signal conversion cable 20 is driven, converts the video signal transmitted from the smartphone 12, and transmits the converted video signal to the display apparatus 100.

First Procedure of Processing Performed by Display Apparatus

Figure 5:
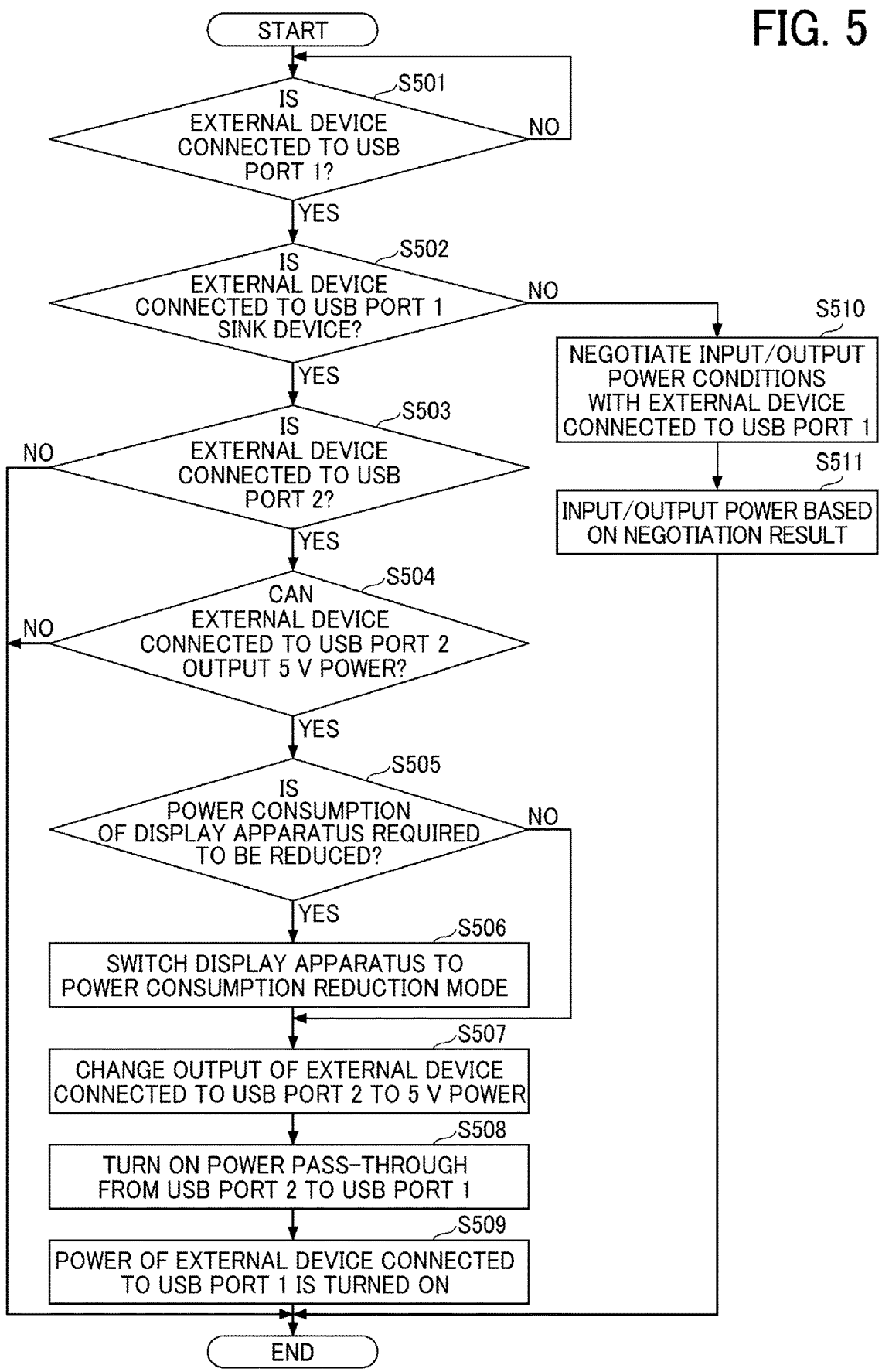
FIG. 5 is a flowchart of the first procedure of processing performed by a display apparatus according to an embodiment of the present disclosure.

FIG. 5 is a flowchart of the first procedure of processing performed by the display apparatus 100 according to the present embodiment.

In the following description, the "USB port 1" corresponds to the first USB port 105A (a first connector) included in the display apparatus 100, and the "USB port 2" corresponds to the second USB port 105A (a second connector) included in the display apparatus 100.

Further, in the following description, it is assumed that the external device 10 connected to the USB port 1 is the second external device 10 (such as the video signal conversion cable 20) serving as a power supply destination, and it is assumed that another external device 10 connected to the USB port 2 is the first external device 10 (such as the AC adapter 11) serving as a power supply source.

It is also assumed that the first external device 10 (the AC adapter) is already connected to the USB port 2 before the processing of FIG. 5 starts.

The connection detection unit 111 determines whether the second external device 10 is connected to the USB port 1 (step S501). For example, the connection detection unit 111 determines whether the second external device 10 is connected to the USB port 1 based on the resistance value of a specific terminal (e.g., a CC pin) included in the USB port 1 in accordance with the specification of the USB standard.

When it is determined in step S501 that the second external device 10 is not connected to the USB port 1 (NO in step S501), the connection detection unit 111 executes the processing of step S501 again.

On the other hand, when it is determined in step S501 that the second external device 10 is connected to the USB port 1 (YES in step S501), the connection detection unit 111 determines whether the second external device 10 connected to the USB port 1 is a sink device (the external device 10 serving as a power supply destination) (step S502). For example, the connection detection unit 111 determines whether the second external device 10 connected to the USB port 1 is a sink device based on the resistance value of a specific terminal (e.g., a CC pin) included in the USB port 1 in accordance with the specification of the USB standard. When the video signal conversion cable 20 is connected to the USB port 1 as the second external device 10, the connection detection unit 111 determines that the second external device 10 connected to the USB port 1 is the sink device.

When it is determined in step S502 that the second external device 10 connected to the USB port 1 is not a sink device (NO in step S502), the negotiation unit 112 performs negotiation with the second external device 10 connected to the USB port 1 in accordance with the specification of the USB-PD standard (step S510).

Then, the power output unit 113, based on a result of the negotiation in step S510, outputs electric power to the second external device 10 connected to the USB port 1 or inputs electric power from the second external device 10 connected to the USB port 1 (step S511). Subsequently, the display apparatus 100 ends the series of the processing illustrated in FIG. 5.

On the other hand, when it is determined in step S502 that the second external device 10 connected to the USB port 1 is a sink device (YES in step S502), the connection detection unit 111 determines whether the first external device 10 is connected to the USB port 2 (step S503). For example, the connection detection unit 111 determines whether the first external device 10 is connected to the USB port 2 based on the resistance value of a specific terminal (e.g., a CC pin) included in the USB port 2 in accordance with the specification of the USB standard.

When it is determined in step S503 that the first external device 10 is not connected to the USB port 2 (NO in step S503), the display apparatus 100 ends the series of the processing illustrated in FIG. 5.

On the other hand, when it is determined in step S503 that the first external device 10 is connected to the USB port 2 (YES in step S503), the negotiation unit 112 performs negotiation with the first external device 10 connected to the USB port 2 in accordance with the specification of the USB-PD standard to determine whether the first external device 10 connected to the USB port 2 can output electric power of 5 V (i. e., the voltage required by the second external device 10 connected to the USB port 1) (step S504).

At this point, the negotiation unit 112 does not perform negotiation with the second external device 10 connected to the USB port 1, but uses electric power of a particular voltage value that is the electric power of 5 V required by the second external device 10 connected to the USB port 1 to drive the second external device 10 connected to the USB port 1. The particular value is stored in a memory in advance.

When it is determined in step S504 that the first external device 10 connected to the USB port 2 cannot output the electric power of 5 V (NO in step S504), the display apparatus 100 ends the series of the processing illustrated in FIG. 5.

On the other hand, when it is determined in step S504 that the first external device 10 connected to the USB port 2 can output the electric power of 5 V (YES in step S504), the pass-through control unit 114 determines whether the power consumption of the display apparatus 100 is to be reduced (step S505).

In step S505, the pass-through control unit 114 determines that the power consumption of the display apparatus 100 is to be reduced when the following formula (1) is satisfied.

Electric power supplied from the first external device 10 connected to the USB port 2

$$\text{Power consumption of the display apparatus } 100 < \text{Electric power required by the second external device 10 connected to the USB port 1} \quad \text{Formula (1):}$$

In other words, the pass-through control unit 114 reduces the power consumption of the display apparatus 100 on the condition that the value of the electric power obtained by subtracting the power consumption of the display apparatus 100 from the value of the electric power supplied from the first external device 10 connected to the USB port 2 is smaller than the value of the electric power required by the second external device 10 connected to the USB port 1.

When it is determined in step S505 that the power consumption of the display apparatus 100 is to be reduced (YES in step S505), the pass-through control unit 114 switches the display apparatus 100 to a power consumption reduction mode to reduce the power consumption of the display apparatus 100 (step S506). Subsequently, the display apparatus 100 proceeds the processing to step S507.

On the other hand, when it is determined in step S505 that the power consumption of the display apparatus 100 is not to be reduced (NO in step S505), the display apparatus 100 proceeds the processing to step S507.

In step S507, the negotiation unit 112 performs negotiation with the first external device 10 connected to the USB port 2 to change the electric power output from the first external device 10 connected to the USB port 2 to the electric power of 5 V (step S507).

Specifically, the negotiation unit 112 notifies the sink device (the second external device 10 connected to the USB port 1) of a plurality of voltage values that the source device (the first external device 10 connected to the USB port 2) can output. The negotiation unit 112 receives, from the sink device, a notification of a voltage value, i.e., 5 V in the present embodiment, required by the sink device among the voltage values. Further, the negotiation unit 112 notifies the source device to output the voltage value, i.e., 5 V in the present embodiment, required by the sink device. In this way, the source device starts supplying electric power having the voltage value required by the sink device.

The pass-through control unit 114 turns on the function of the power pass-through from the USB port 2 to the USB port 1 (step S508).

As a result, a part of the electric power of 5 V input from the USB port 2 is output from the USB port 1 as the electric power required by the second external device 10 connected to the USB port 1, and the power of the second external device 10 connected to the USB port 1 is turned on (step S509).

For example, it is assumed that the second external device 10 connected to the USB port 1 is the video signal conversion cable 20. When the power of the video signal conversion cable 20 is turned on, the video signal conversion cable 20 can start conversion of a video signal transmitted from a communication terminal such as a smartphone and transmission of the converted video signal to the display apparatus 100.

Subsequently, the display apparatus 100 ends the series of the processing illustrated in FIG. 5.

Message and Brightness Setting Screen Displayed by Display Apparatus

Figure 6:
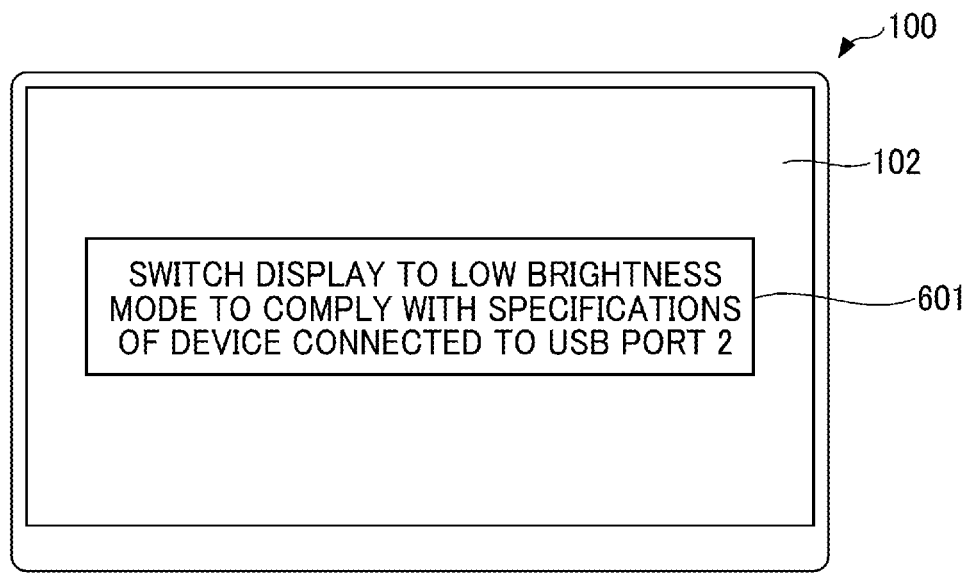
FIG. 6 is a diagram illustrating a message displayed by a display apparatus according to an embodiment of the present disclosure.
Figure 7:
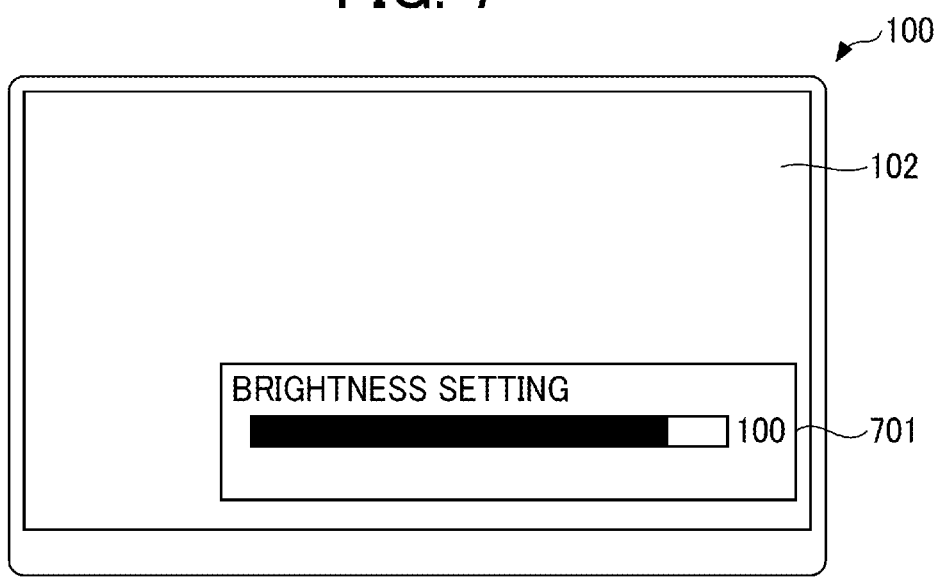
FIG. 7 is a diagram illustrating a brightness setting screen displayed by a display apparatus according to an embodiment of the present disclosure.
Figure 8:
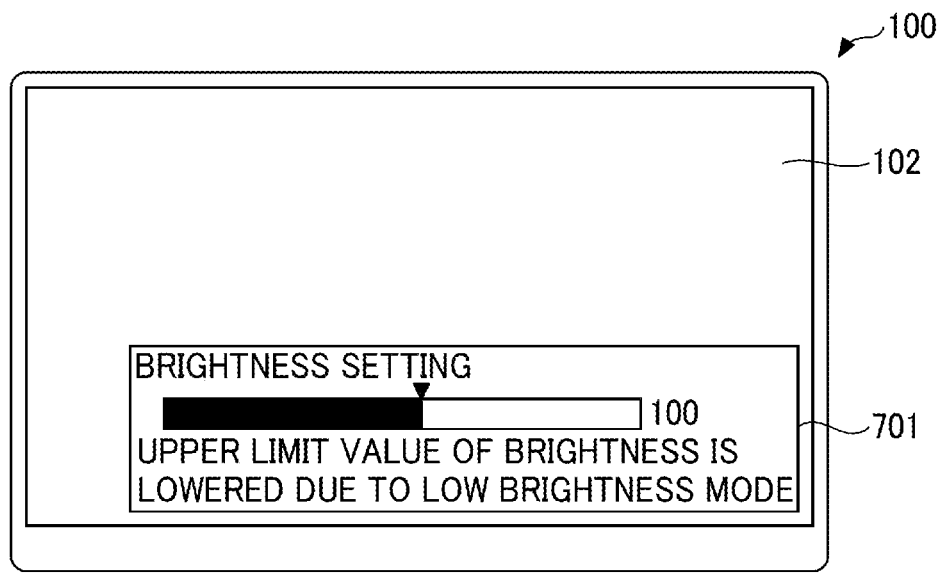
FIG. 8 is a diagram illustrating another brightness setting screen displayed by a display apparatus according to an embodiment of the present disclosure.
Figure 9:
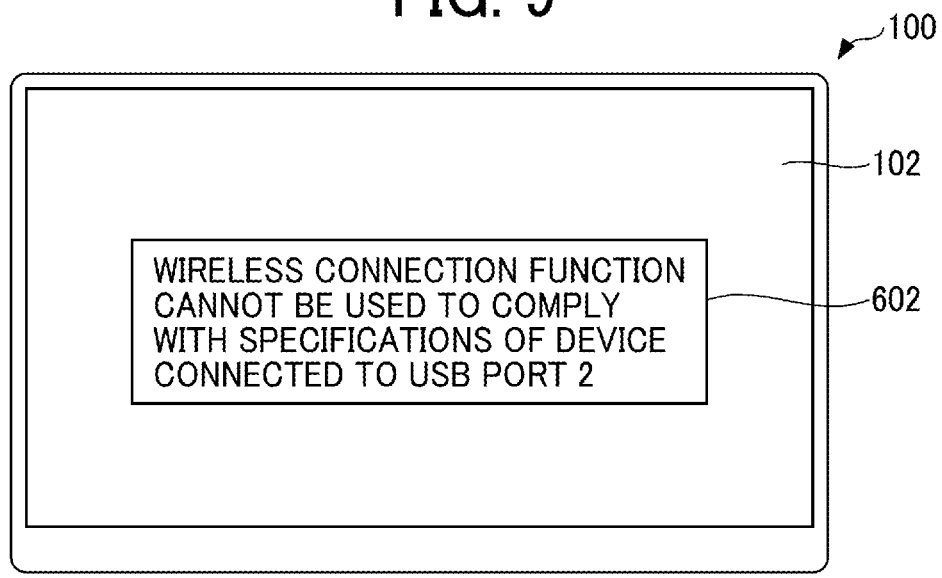
FIG. 9 is a diagram illustrating another message displayed by a display apparatus according to an embodiment of the present disclosure.

FIGS. 6 and 9 are diagrams each illustrating a message displayed by the display apparatus 100 according to the present embodiment. FIGS. 7 and 8 are diagrams each illustrating a brightness setting screen displayed by the display apparatus 100 according to the present embodiment.

As described above, when the electric power that can be output from the first USB port 105A is determined to be smaller than the electric power required by the second external device 10, the display apparatus 100 according to the embodiment is switched to the low brightness mode from a normal mode. Accordingly, the display apparatus 100 according to the embodiment can reduce the power consumption of the display apparatus 100 to output the electric power required by the second external device 10 from the first USB port 105A.

In this case, as illustrated in FIG. 6, the display control unit 115 displays, on the display panel 102, a message 601 for notifying the operator that the display apparatus 100 is to be switched to the low brightness mode.

As illustrated in FIGS. 7 and 8, in response to an operation to the UI 104 performed by the operator, the display control unit 115 displays, on the display panel 102, a brightness setting screen 701 that indicates a setting value of the brightness of the display panel 102 in a bar graph.

In FIG. 7, the brightness setting screen 701 when the display apparatus 100 is in the normal mode is illustrated. In FIG. 8, the brightness setting screen 701 when the display apparatus 100 is in the low brightness mode is illustrated. The brightness setting screen 701 illustrated in FIG. 8 presents that the upper limit value of the brightness of the display panel 102 is lowered.

As illustrated in FIG. 8, when the upper limit value of the brightness of the display panel 102 is lowered and the operator performs an operation to increase the brightness of the display panel 102 beyond the upper limit value, the pass-through control unit 114 invalidates the operation.

In an alternative embodiment of the present disclosure, when the electric power that can be output from the first USB port 105A is determined to be smaller than the electric power required by the second external device 10, the display apparatus 100 according to the present embodiment turns off the wireless communication function (e.g., the communication I/F 103) included in the display apparatus 100. Accordingly, the display apparatus 100 according to the embodiment can reduce the power consumption of the display apparatus 100 to output the electric power required by the second external device 10 from the first USB port 105A.

In this case, as illustrated in FIG. 9, the display control unit 115 displays, on the display panel 102, a message 602 for notifying the operator that the wireless communication function included in the display apparatus 100 is to be turned off.

Figure 10:
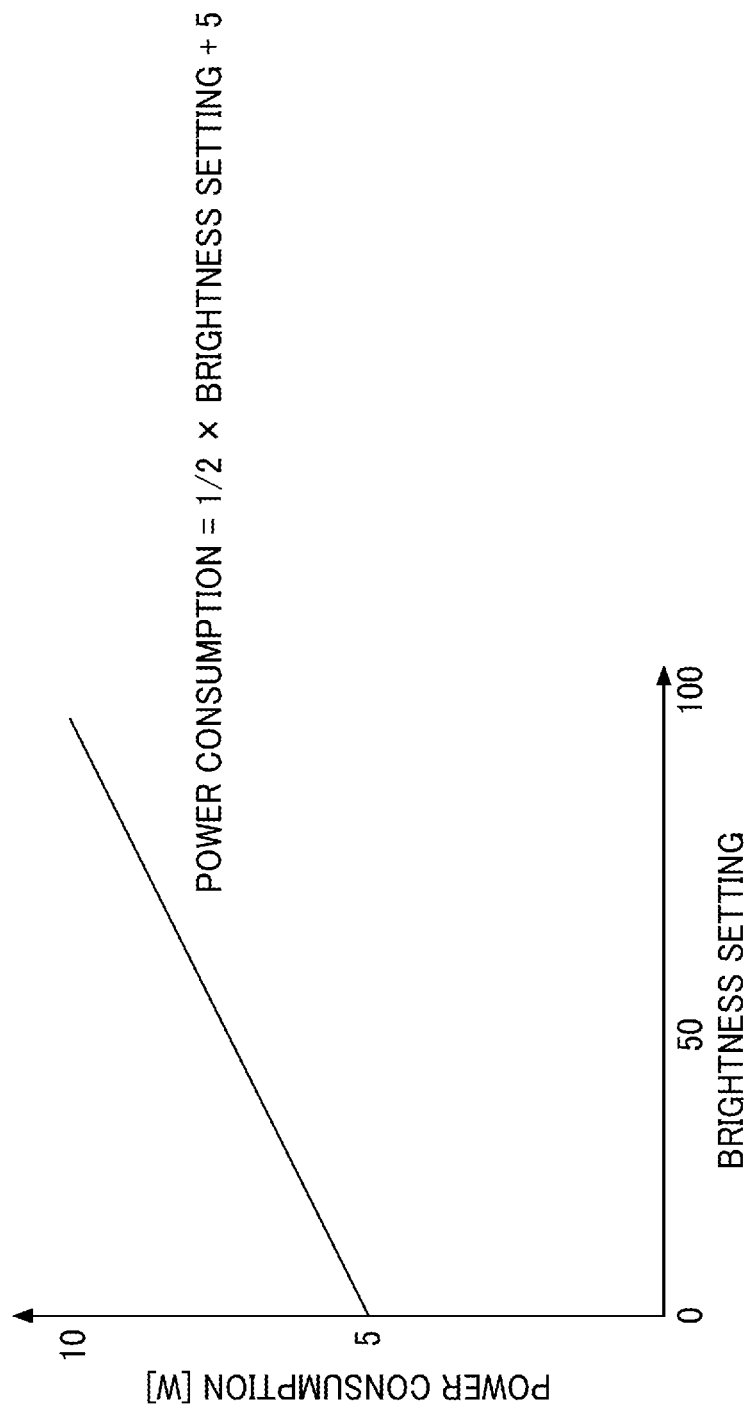
FIG. 10 is a graph illustrating the relation between the brightness setting value and the power consumption of a display panel included in a display apparatus according to an embodiment of the present disclosure.

Relation Between Brightness Setting Value and Power Consumption of Display Panel FIG. 10 is a graph illustrating the relation between the brightness setting value and the power consumption of the display panel 102 included in the display apparatus 100 according to the present embodiment.

In the graph illustrated in FIG. 10, the vertical axis represents power consumption [W] of the display panel 102 and the horizontal axis represents the brightness setting value of the display panel 102.

As illustrated in FIG. 10, the brightness setting value of the display panel 102 can be set in a range from "0" to "100."

The power consumption of the display panel 102 increases in proportion to the brightness setting value. For this reason, the display apparatus 100 according to the embodiment can reduce the power consumption of the display apparatus 100 by lowering the upper limit value of the brightness setting value of the display panel 102.

For example, in the present embodiment with reference to FIG. 10, the power consumption of the display panel 102 is obtained by the following formula (2).

$$\text{Power consumption } [W] = \tfrac{1}{2} \times \text{Brightness setting value} + 5 \quad \text{Formula (2):}$$

Second Procedure of Processing Performed by Display Apparatus

Figure 11:
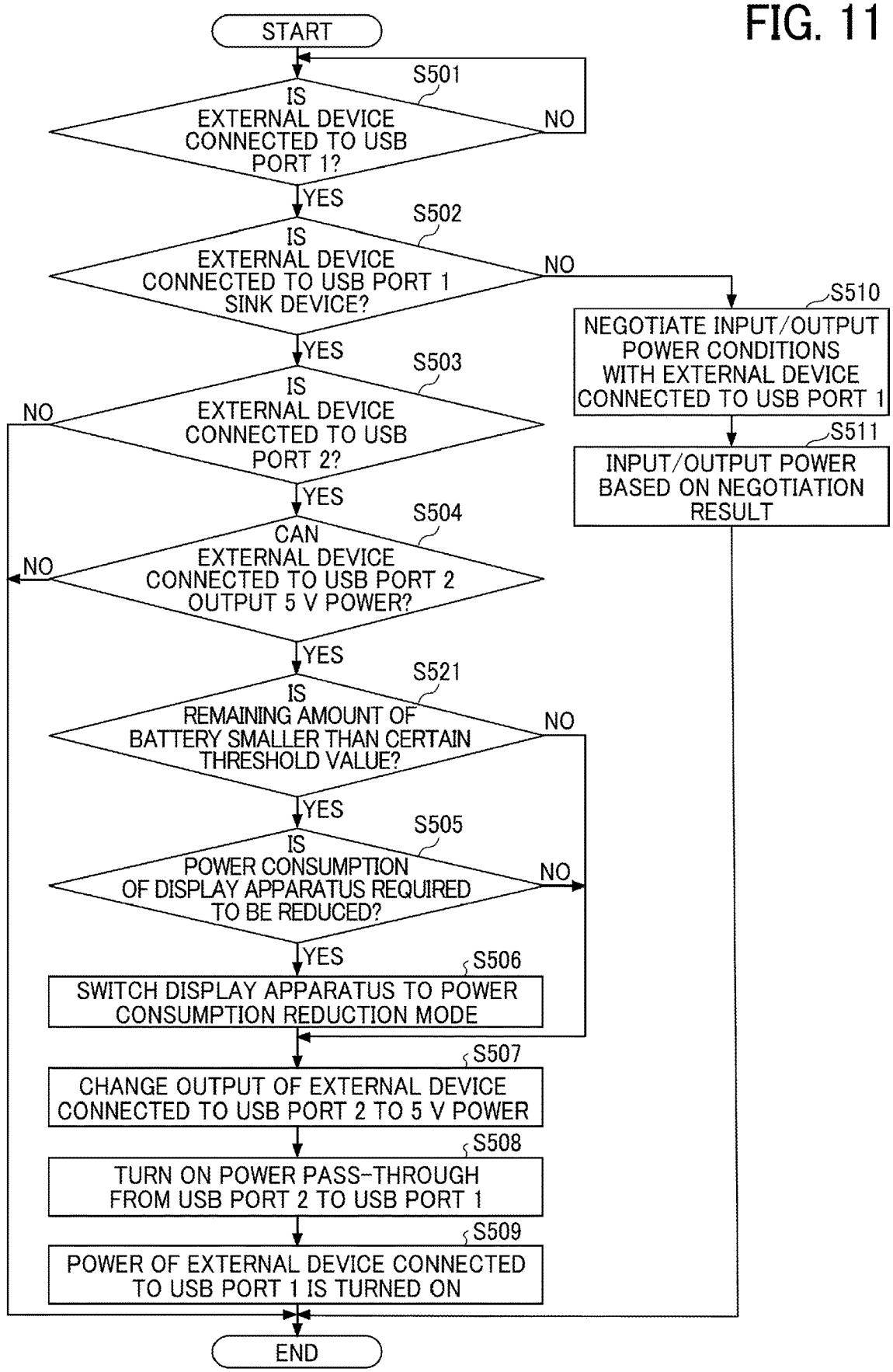
FIG. 11 is a flowchart of the second procedure of processing performed by a display apparatus according to an embodiment of the present disclosure.

FIG. 11 is a flowchart of the second procedure of processing performed by the display apparatus 100 according to the present embodiment.

The flowchart of FIG. 11 differs from the flowchart of FIG. 5 in that step S521 is included between step S504 and step S505.

In step S521, the pass-through control unit 114 determines whether a remaining amount of the battery 108 included in the display apparatus 100 is smaller than a certain threshold value (step S521). As the certain threshold value, at least a value of the remaining amount sufficient to drive the display apparatus 100 with the battery is used.

When it is determined in step S521 that the remaining amount of the battery is smaller than the certain threshold value (YES in S521), the display apparatus 100 proceeds the processing to step S505.

On the other hand, when it is determined in step S521 that the remaining amount of the battery is not smaller than the certain threshold value (NO in step S521), the display apparatus 100 proceeds the processing to step S507.

It is assumed that the remaining amount of the battery 108 is sufficient to drive the display apparatus 100 with the battery (the remaining amount is equal to or greater than the certain threshold value). According to the flowchart of FIG. 11, even when the electric power that can be output from the USB port 1 is determined to be smaller than the electric power required by the second external device 10 connected to the USB port 1, the display apparatus 100 can output the electric power required by the second external device 10 connected to the USB port 1 from the USB port 1 without consuming the electric power input from the USB port 2 by being driven with the battery 108. In this way, the electric power required by the second external device 10 connected to the USB port 1 can be output from the USB port 1. As a result, according to the flowchart of FIG. 11, the frequency of lowering the power consumption of the display apparatus 100 is reduced, and thus a decrease of operability for the operator is prevented or eliminated.

When the remaining amount of the battery 108 falls below the certain threshold value while the display apparatus 100 is being driven with the battery, the display apparatus 100 may stop driving the display apparatus 100 with the battery and switch the display apparatus 100 to the power consumption reduction mode to reduce the power consumption of the display apparatus 100. Accordingly, the display apparatus 100 can continuously supply the electric power to the second external device 10 connected to the USB port 1.

Third Procedure of Processing Performed by Display Apparatus

Figure 12:
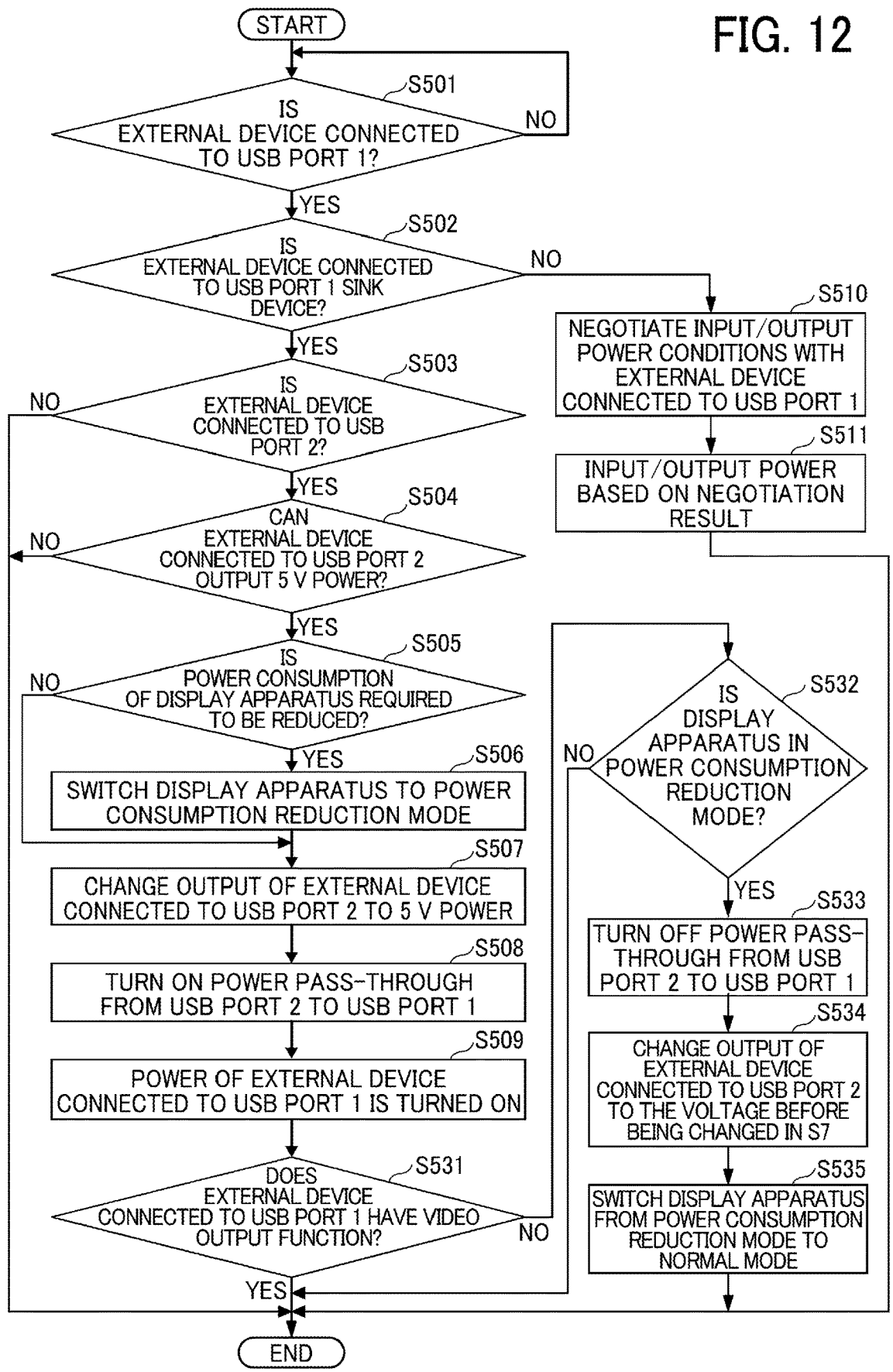
FIG. 12 is a flowchart of a third example of processing performed by a display apparatus according to an embodiment of the present disclosure.

FIG. 12 is a flowchart of the third procedure of processing performed by the display apparatus 100 according to the present embodiment.

The flowchart of FIG. 12 differs from the flowchart of FIG. 5 in that steps S531 to S535 are included after step S509.

In step S531, the pass-through control unit 114 determines whether the second external device 10 connected to the USB port 1 has a video output function (step S531).

When it is determined in step S531 that the second external device 10 connected to the USB port 1 has the video output function (YES in step S531), the display apparatus 100 ends the series of the processing illustrated in FIG. 12.

On the other hand, when it is determined in step S531 that the second external device 10 connected to the USB port 1 does not have the video output function (NO in step S531), the pass-through control unit 114 determines whether the display apparatus 100 is in the power consumption reduction mode (step S532).

When it is determined in step S532 that the display apparatus 100 is not in the power consumption reduction mode (NO in step S532), the display apparatus 100 ends the series of the processing illustrated in FIG. 12.

On the other hand, when it is determined in step S532 that the display apparatus 100 is in the power consumption reduction mode (YES in step S532), the pass-through control unit 114 turns off the function of the power pass-through from the USB port 2 to the USB port 1 (step S533).

The negotiation unit 112 performs negotiation with the first external device 10 connected to the USB port 2 to change the electric power output from the first external device 10 connected to the USB port 2 to the voltage before being changed to 5 V (step S534).

The pass-through control unit 114 switches the display apparatus 100 from the power consumption reduction mode to the normal mode (step S535). Subsequently, the display apparatus 100 ends the series of the processing illustrated in FIG. 12.

It is assumed that the second external device 10 connected to the USB port 1 does not have the video output function. According to the flowchart of FIG. 12, even when the electric power that can be output from the USB port 1 is determined to be smaller than the electric power required by the second external device 10 connected to the USB port 1, the display apparatus 100 is not switched to the power consumption reduction mode and does not output the electric power from the USB port 1. As a result, according to the flowchart of FIG. 12, the frequency of lowering the power consumption of the display apparatus 100 is reduced, and thus a decrease of operability for the operator is prevented or eliminated.

According to the above-described embodiment, screen display of the display apparatus 100 using a communication terminal and a video signal conversion cable can be performed in various environments. There is a case where the operator desires to use the display apparatus 100 in a scene where the environment changes from time to time. Such a scene where the environment changes from time to time includes, for example, a scene in which the location of the operator holding the display apparatus 100 is changed, a scene in which a communication terminal (such as a laptop PC, a smartphone, or a tablet PC) that presents a screen to be displayed on the display apparatus 100 is changed, and a scene in which a video signal conversion cable or an AC adapter to be connected to the display apparatus 100 for use is changed. The display apparatus 100 can display a screen presented by the communication terminal in many scenes even in such a case.

The above-described embodiment is illustrative and does not limit the present disclosure. Thus, numerous additional modifications and variations are possible in light of the above teachings. For example, elements and/or features of different illustrative embodiments may be combined with each other and/or substituted for each other within the scope of the present disclosure.

For example, the "connector" is not limited to a "USB" port, and may be any connector that allows at least a function of power pass-through.

Further, for example, the method of "reducing the power consumption of the display apparatus" is not limited to the method of lowering the upper limit value of the brightness of the display panel or the method of turning off the wireless communication function included in the display apparatus. Any method may be used as long as the method reduces at least the power consumption of the display apparatus.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A display apparatus comprising:
    a display panel configured to display an image;
    a plurality of connectors including a first connector and a second connector, the plurality of connectors each being connectable with one of a plurality of external devices including a first external device and a second external device, the first external device being a device from which electric power is to be supplied, and the second external device being a device to which electric power is to be supplied; and
    circuitry configured to:
        detect that one of the plurality of external devices is connected to one of the plurality of connectors;
        perform negotiation on electric power supplied from the first external device and required for the second external device to operate; and
        control power consumption of the display apparatus such that part of the electric power supplied from the first external device to the display apparatus is passed to the second external device, based on a result of the negotiation,
    wherein, in a case in which the circuitry detects that the first external device is connected to the first connector and the second external device is connected to the second connector, the circuitry is further configured to:
determine whether the power consumption of the display apparatus needs to be reduced based on the electric power supplied from the first external device and required for the second external device; and
in a case in which the circuitry determines that the power consumption of the display apparatus needs to be reduced, reduce the power consumption of the display apparatus by an amount of the electric power to satisfy a requirement for the second external device to operate, and pass the amount of the electric power to the second external device.

2. The display apparatus according to claim 1, wherein the circuitry is configured to lower an upper limit value of brightness of the display panel to reduce the power consumption of the display apparatus.

3. The display apparatus according to claim 2, wherein the circuitry is configured to determine an amount of the upper limit value of the brightness of the display panel to be lowered in accordance with a shortage amount of the electric power to be used by the first external device.

4. The display apparatus according to claim 2, wherein the circuitry is further configured to, in a case in which the upper limit value of the brightness of the display panel is lowered, invalidate an operation for increasing the brightness of the display panel beyond the upper limit value.

5. The display apparatus according to claim 1, further comprising:
a communication interface,
wherein the circuitry is configured to turn off a wireless communication function of the communication interface, so as to reduce the power consumption of the display apparatus.

6. The display apparatus according to claim 1, further comprising a battery to supply electric power to drive the display apparatus,
wherein the circuitry is further configured to determine whether a remaining amount of the battery is equal to or greater than a threshold value, in a case in which the electric power to be output from the second connector is determined to be smaller than the electric power to be used by the second external device, and
based on a determination that the remaining amount of the battery is equal to or greater than the threshold value, drive the display apparatus with the battery, and
output, from the second connector, the electric power input from the first connector without reducing the power consumption of the display apparatus.

7. The display apparatus according to claim 1, wherein the circuitry is further configured to determine whether the second external device has a video output function, and
based on a determination that the second external device does not have the video output function,
prevent output of electric power from the second connector, without reducing the power consumption of the display apparatus.

8. The display apparatus according to claim 1, wherein the circuitry is further configured to, in a case in which connection of the second connector with the second external device is detected after connection of the first connector with the first external device is detected,
perform negotiation with the first external device at a time when the connection of the second connector with the second external device is detected, and
cause the first external device to output electric power having a voltage value compatible with the second external device.

9. The display apparatus according to claim 1, wherein the circuitry is further configured to, in a case in which the second external device that is connected is determined to be a power supply destination,
output electric power of a particular voltage value sufficient to drive the second external device from the second connector without performing negotiation with the second external device.

10. The display apparatus according to claim 1, wherein the plurality of connectors are capable of transmitting or receiving data to and from the plurality of external devices connected to the plurality of connectors, in addition to input or output of electric power.

11. The display apparatus according to claim 1, wherein at least one of the plurality of connectors is a universal serial bus (USB) port.

12. The display apparatus according to claim 1, wherein the circuitry is further configured to display, on the display panel, a message for notifying an operator that the power consumption of the display apparatus is to be reduced.

* * * * *